United States Patent
Bishop et al.

[19]

[11] Patent Number: 5,879,105
[45] Date of Patent: Mar. 9, 1999

[54] WAVE ENERGY DISPERSION SYSTEM

[76] Inventors: Robert Bishop; Justin Bishop, both of 1083 Bloomfield Ave., West Caldwell, N.J. 07006

[21] Appl. No.: 768,559

[22] Filed: Dec. 18, 1996

[51] Int. Cl.[6] ..................................................... E02B 3/04
[52] U.S. Cl. ................................ 405/26; 405/21; 405/25; 405/33; 405/28
[58] Field of Search .................................. 405/21, 22, 23, 405/25, 26, 28, 33, 34, 35; 114/267, 294; 441/1, 35, 133

[56] References Cited

U.S. PATENT DOCUMENTS

| | | |
|---|---|---|
| 527,513 | 10/1894 | See et al. . |
| 1,593,863 | 7/1926 | Brasher . |
| 3,237,414 | 3/1966 | Straub et al. ........................ 441/35 X |
| 3,373,821 | 3/1968 | Sare . |
| 3,755,829 | 9/1973 | Walklet .............................. 441/133 X |
| 3,822,499 | 7/1974 | De Vos .................................. 441/1 X |
| 3,842,606 | 10/1974 | Stiles et al. . |
| 3,846,990 | 11/1974 | Bowley . |
| 3,894,397 | 7/1975 | Fair . |
| 3,938,338 | 2/1976 | Cullen . |
| 4,027,486 | 6/1977 | Dougherty ........................ 114/267 X |
| 4,118,937 | 10/1978 | Mansen . |
| 4,175,887 | 11/1979 | Mougin .................................. 405/28 X |
| 4,178,517 | 12/1979 | Salomon et al. . |
| 4,234,266 | 11/1980 | Angioletti ................................ 405/26 |
| 4,264,233 | 4/1981 | McCambridge . |
| 4,341,489 | 7/1982 | Karnas . |
| 4,407,607 | 10/1983 | McCambridge . |
| 4,431,337 | 2/1984 | Iwasa . |
| 4,669,913 | 6/1987 | Temple . |
| 4,691,661 | 9/1987 | Deiana . |
| 4,712,944 | 12/1987 | Rose ........................................ 405/26 |
| 4,729,691 | 3/1988 | Sample . |
| 4,729,692 | 3/1988 | Tucker . |
| 4,748,338 | 5/1988 | Boyce . |
| 4,776,724 | 10/1988 | Isozaki . |
| 4,776,725 | 10/1988 | Brade . |
| 4,844,654 | 7/1989 | Widerman . |
| 4,856,933 | 8/1989 | Tubbs, Jr. . |
| 4,856,934 | 8/1989 | Nelson . |
| 4,856,935 | 8/1989 | Haras . |
| 4,900,188 | 2/1990 | Haselton et al. . |
| 5,104,258 | 4/1992 | Ianell . |
| 5,122,015 | 6/1992 | Shen . |
| 5,192,161 | 3/1993 | Helgesson et al. ..................... 114/267 |
| 5,238,325 | 8/1993 | Krenzler . |
| 5,238,326 | 8/1993 | Creter . |
| 5,246,307 | 9/1993 | Rauch . |
| 5,259,696 | 11/1993 | Beardsley . |
| 5,556,229 | 9/1996 | Bishop et al. . |
| 5,564,369 | 10/1996 | Barber et al. . |
| 5,575,584 | 11/1996 | Alsop ........................................ 405/24 |

FOREIGN PATENT DOCUMENTS

| | | | |
|---|---|---|---|
| 2663900 | 1/1992 | France | ................................... 114/267 |
| 805789 | 12/1958 | United Kingdom . | |

*Primary Examiner*—Tamara L. Graysay
*Assistant Examiner*—Jong-Suk Lee
*Attorney, Agent, or Firm*—Weingram & Associates, P.C.

[57] ABSTRACT

An energy dissipating assembly for flowing water is provided which consists of a plurality of modules, each one of the modules being a buoyant body consisting of a continuous envelope defining a hollow watertight chamber, the envelope having a plurality of intersecting planar surfaces and an attaching members connected to at least two spaced locations on the continuous envelope to attach the buoyant body in a three dimensional relationship. Parts are also provided to adjust the buoyancy and mass of the buoyant body so that the assembly can be tuned for the wave activity of the water in which the system is disposed. A method of disrupting the wave action is also provided.

30 Claims, 9 Drawing Sheets

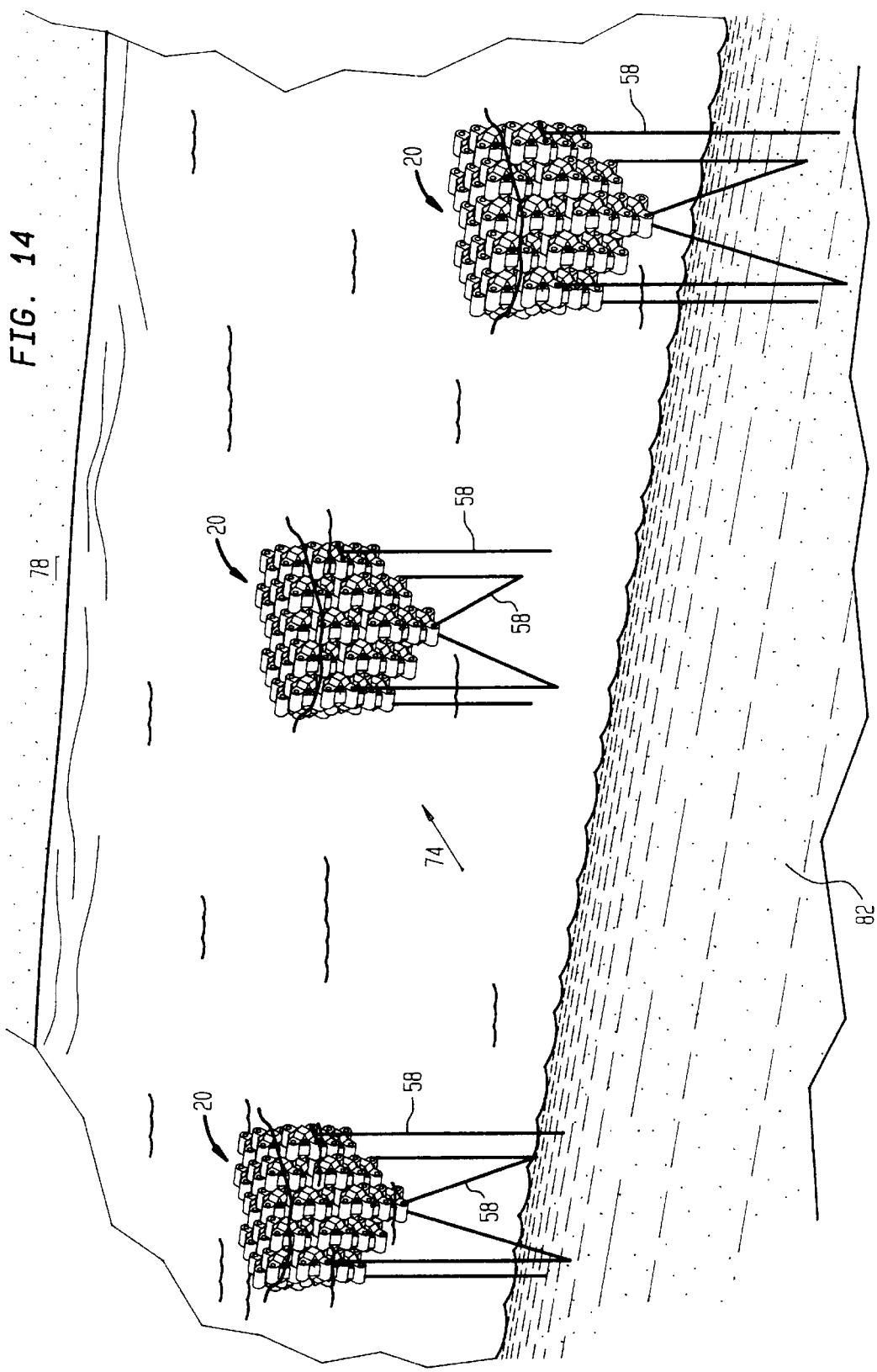

WAVE ENERGY DISPERSION SYSTEM

BACKGROUND OF THE INVENTION

1. Field of the Invention

The present invention relates to apparatus and systems for extracting energy from flowing water and in particular, to those devices and systems that are adapted to be removably mounted offshore at select locations to extract energy from the waves.

2. Description of the Related Art

The construction and arrangement of breakwaters to reduce erosion of ocean shelves and the shoreline has changed since use of concrete fixtures. For example, such devices and systems have been disclosed in:

| U.S. Pat. No. | Inventor(s) |
|---|---|
| 527,513 | See et al. |
| 1,593,863 | Brasher |
| 3,373,821 | Sare |
| 3,842,606 | Stiles |
| 3,846,990 | Bowley |
| 3,894,397 | Fair |
| 3,938,338 | Cullen |
| 4,118,937 | Mansen |
| 4,178,517 | Salomon et al. |
| 4,264,233 | McCambridge |
| 4,341,489 | Karnas |
| 4,407,607 | McCambridge |
| 4,431,337 | Iwasa |
| 4,669,913 | Temple |
| 4,691,661 | Deiana |
| 4,729,691 | Sample |
| 4,729,692 | Techer |
| 4,748,338 | Boyce |
| 4,776,724 | Iswald |
| 4,776,725 | Brode |
| 4,844,654 | Widerman |
| 4,856,933 | |
| 4,856,934 | Nelson |
| 4,856,935 | Haras |
| 4,900,188 | Haselton et al. |
| 5,104,258 | Ianell |
| 5,122,015 | Shen |
| 5,238,325 | Krenzler |
| 5,238,326 | Creter |
| 5,246,307 | Rauch |
| 5,250,696 | Beardsley |
| 5,556,229 | Bishop et al |
| 5,564,369 | Barber et al. |
| Foreign Patent | Laurie |
| 805,789 (British) | |

British Patent No. 805,789 also discloses a breakwater device which employs gas bubbles in the path of wave motion to reduce sea waves and swell.

Traditional breakwaters, seawalls, jetties have failed to substantially curtail the destructive force of moving water primarily because of their construction, and tendencies to reflect or direct wave energy in destructive ways or concentrate the energy in local hot spots. Erosion and the scouring effects of the misdirected energy lead to the loss of the beach and undermining of the structures which were meant to protect the shoreline.

In addition, other fixed structures such as groins lead to the loss of natural flows and downdrift beaches by interrupting the littoral flows of sand and generally create a surplus condition on the updrift side and a starvation condition on the downdrift beaches.

Other erosion control systems which flow offshore do not provide the arrangement of surfaces which deflect and redirect breaking waves so that eddies and vortexes produced interfere with and cancel each other, as well as the oncoming portions of the next successive wave.

Many of these known devices and systems are rigidly mounted to the shore or shelf portion underneath the surf in a manner which severely restricts, if not eliminates, removal of the system to another remote location where the barriers are needed more urgently.

OBJECTS AND SUMMARY OF THE INVENTION

It is a principle object of the present invention to provide a wave energy dispersion module and system constructed and arranged to moderate, attenuate and dissipate energy transmitted through flowing water and gravity waves.

It is an object of the present invention to provide a module constructed to dissipate energy from flowing water regardless of the amount of water or the size of any waves, such that erosion of a shoreline is substantially reduced if not eliminated.

It is another object of the present invention to provide a plurality of the modules arranged as a unit to be disposed offshore to extract wave energy and substantially reduce if not eliminate coastal erosion.

It is another object of the present invention to provide a plurality of units consisting of the modules, the units arranged in a staggered formation offshore to extract energy from waves and substantially reduce if not eliminate coastal erosion.

It is another object of the present invention to provide a wave energy extraction system which is constructed to be anchored offshore and removably mountable in its configuration such that removal to a remote location is quick, easy, and less expensive to implement than known systems.

It is another object of the present invention to provide modules constructed and arranged with respect to each other in the units such that water passages of different dimensions are provided to effect movement of the waves through the unit.

It is another object of the present invention to provide modules with a construction such that waves impinging on the modules are directed to form eddies and vortexes which impact and interfere with each other and effectively cancel each other.

It is another object of the present invention to provide a plurality of wave energy extraction units mounted to the sea floor by flexible support assemblies which permit the units to move and extract energy from the waves.

It is another object of the present invention to provide a wave energy extraction system which substantially reduces the effect of wave energy on the surf zone and the loss of sand therealong.

It is another object of the present invention to provide a wave energy extraction system constructed and arranged to be particularly effective in depths of water where most onshore erosion occurs.

It is another object of the present invention to provide a wave energy extraction system having a plurality of units which can be filled with a substance to control the weight, or tune the system with respect to the size and amplitude of the waves impacting the system.

It is another object of the present invention to provide a wave energy extraction system which has a portion thereof floating just above the surface and upon which marine mammals can be supported.

It is another object of the present invention to provide a wave energy extraction system which does not impact upon the marine environment and which is aesthetically pleasing.

It is another object of the present invention to provide a wave energy extraction system constructed and arranged as an inverted pyramid to dissipate wave energy along a plurality of deflecting surfaces and facets, such that the incoming waves interfere with themselves.

It is another object of the present invention to provide a wave energy dispersion system which because of its inverted pyramid shape substantially reduces the wave height thereby reducing the erosionary nature of the wave energy moving toward the shoreline.

It is another object of the present invention to provide a wave energy extraction system and anchoring system to coact therewith such that the frequency of the system can be tuned depending upon the particular activity of the waves at that location.

It is another object of the present invention to provide a wave energy extraction system which is capable of converting the wave energy to heat, mechanical motion and kinetic energy.

It is another object of the present invention to provide a wave energy extraction system which is resiliently mounted by an anchoring system, and which is adapted to expand to absorb incoming flowing water for fracturing the wave.

It is another object of the present invention to provide a wave energy extraction system consisting of a multiplicity of individual modules flexibly mounted together which coact with one another to force the incoming waves to form eddies and vortexes which interfere with each other, thereby extracting energy from the wave.

It is another object of the present invention to provide a wave energy extraction system which is relatively inexpensive to construct and maintain and substantially increases the percentage of wave energy extracted.

It is another object of the present invention to provide a wave energy extraction system which is easy to assemble and disassemble, and is removably mountable to its anchoring system such that the system requiring repair can easily be removed and another system substituted therefor in a relatively short amount of time.

It is another object of the present invention to provide a wave energy extraction system consisting of a plurality of layers of modules, which layers are constructed and arranged in a staggered arrangement to fracture the incoming wave flow and provide eddies and vortexes directed into passages of the system to interfere with successive wave flow.

It is another object of the present invention to provide a wave energy extraction system which employs a concertina effect to interfere with the flowing water.

It is another object of the present invention to provide a wave energy extraction system adapted to have its buoyancy and mass adjusted to reduce the amplitude of waves moving toward the shoreline.

It is another object of the present invention to provide a wave energy extraction system which does not succumb to the detrimental marine environment of breakers, salt water, intense sunlight and weather conditions, undertow and other forms of erosion.

The objects of the present invention are accomplished by providing a module constructed with a plurality of surface facets and transitional surfaces arranged to fracture a wave impinging thereon and direct the wave into eddies and vortices which interfere with each other to substantially reduce the wave energy.

A preferred embodiment of the present invention is a buoyant body consisting of: a continuous envelope defining a hollow water tight chamber, the continuous envelope including: a plurality of intersecting planar surfaces; attaching means connected to at least two spaced locations on the continuous envelope, and constructed and arranged to attach the buoyant body in a three dimensional arrangement; and means to adjust the buoyancy and the mass of the buoyant body.

In another of the preferred embodiments of the present invention, a plurality of the buoyant bodies, i.e. a multiplicity of modules, are arranged as an inverted pyramid in the water such that the coaction of the multiplicity of modules provide for a plurality of avenues, streets, plazas, and shafts arranged throughout the assembly to extract energy from the flowing water.

In still other embodiments of the present invention, there is disclosed a system having an energy dissipating assembly for extracting energy from waves, and a method of disrupting the wave action.

BRIEF DESCRIPTION OF THE DRAWINGS

For a more complete understanding of the present invention, reference may be had to the description of the preferred embodiments taken in conjunction with the accompanying drawings, of which:

FIG. 14 is a top perspective view of a plurality of wave energy extraction systems mounted offshore according to the present invention.

DETAILED DESCRIPTION OF THE PREFERRED EMBODIMENTS

An energy extraction system 20 (hereinafter the "system") of the present invention is constructed and arranged for use offshore in the sea and oceans, as well as for use in the waters surrounding marinas, harbors and the like. Although the system has been characterized for use in particular with ocean waves, it is constructed and arranged to extract energy from flowing water, regardless of how the body of water is classified. In addition, as has been presented in the objects above, one of the advantages of the system 20 is that it can be tuned to efficiently extract energy from flowing water, regardless of whether that water is flowing in the ocean, a delta or a river.

Figure 1:
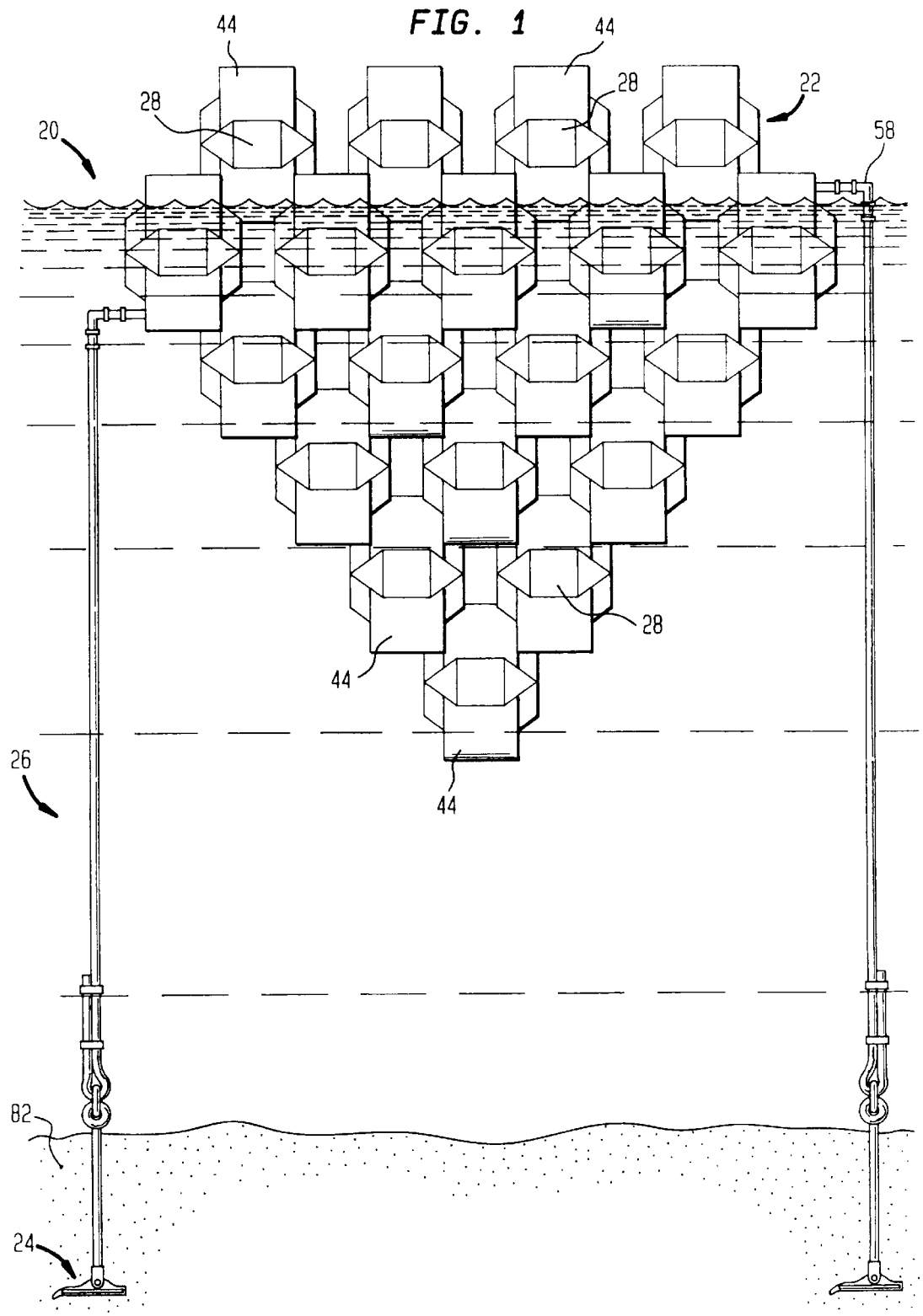
FIG. 1 is a front elevational view of a wave energy extraction system anchored in water according to the present invention.

In FIG. 1, the view of the system 20 is that which would be seen head-on, either onshore or offshore.

Referring to FIGS. 1–8, the system 20 according to the present invention consists of a plurality of modules 22 arranged in, preferably, an inverted pyramid shape, an anchoring assembly 24 and a restraining assembly 26. Although the system 20 is shown in a pyramidal shape, it is understood that the modules 22 can be arranged to form other shapes to be disposed in the water to extract energy therefrom.

In FIGS. 2–8, the module 22 from which the system 20 is constructed is shown. The module 22 consists of a buoyant body having four walls; designated front wall 28, back wall 30, top wall 32 and bottom wall 34. The walls 28–34 are preferably of a rectangular shape.

The body also is provided with a first sidewall 36 and a second sidewall 38 in spaced relation. The sidewalls 36,38 are preferably of a rectangular shape.

Transition surfaces 40 connect each one of said front wall 28, back wall 30, top wall 32 and bottom wall 34 to each of said sidewalls 36,38 in spaced relation as shown in particular in FIG. 1. The transition surfaces 40 are preferably of a triangular shape.

The walls 28–34, the first and second sidewalls 36,38 in spaced relation, and the transition surfaces 40 are all preferably smooth and inclined at angles with each other. Seams 42 along which these surfaces intersect are preferably even and well defined, and provide for a generally 45° angle among the inclined surfaces.

The buoyant body of the module 22 is provided with attaching means so that the plurality of buoyant bodies can be removably mounted and layered in a plurality of rows to arrive at the pyramid configuration of FIG. 1. In particular, each one of the attaching means, preferably four in number, is connected to at least one of each said walls 28–34. In operation, the attaching means resemble and function as a yoke 44.

Each one of the yokes 44 is provided with a protruding end 46 and a transition end 48. The protruding end 46 extends from the said adjacent walls and is constructed with a length that is perpendicular to the first and second sidewalls 36,38 in spaced relation. Preferably, the protruding end 46 of the yoke 44 is formed as a cylindrical section, as shown in FIG. 1, although other shapes for the protruding end 46 can be employed to effectively carry out the invention. A longitudinal axis 50 of the protruding end 46 is arranged substantially perpendicular to a plane of each one of the sidewalls 36,38 in spaced-relation.

Opposed ends 52 of the protruding end 46 of the yoke 44 terminate in spaced apart terminating surfaces 54 which are substantially parallel to each other, and to the first and second sidewalls 36,38 in spaced relation.

Each one of the buoyant bodies is provided with a passage means 56 which is constructed and arranged to extend through the protruding end 46 and the spaced apart terminating surfaces 54 of the yoke 44. Preferably, the distance between the spaced apart terminating surfaces 54 of the protruding end 46 is less than a distance measured between the first and second sidewalls 36,38 in spaced relation. In addition, it is preferable that the spaced apart terminating surfaces 54 of the protruding end 46 be constructed such that they are disposed in parallel relation to each other. This is to facilitate the mounting of a plurality of the modules 22 (buoyant bodies) to one another so that the spaced apart terminating surfaces 54 can function as bearing surfaces which lie flush against one another and provide for uniformity of the passages 56 among the modules as discussed hereinafter.

A distance between the spaced apart terminating surfaces 54 of the protruding end 46 is also greater than a width of each of the walls 28–34 adjacent thereto. The passage means 56 of the protruding end 46 is specifically constructed and arranged for receiving an attaching member 58 as will be discussed hereinafter, more particularly with reference to FIGS. 1 and 9.

Each one of the protruding members ends 46 of the yoke thereof is connected to two adjacent walls of the front, back, top and bottom walls 28–34.

The buoyant body is also provided with another set or second transitional surfaces 60 which interconnect each one of the yokes 44 with one of the first and second sidewalls 36,38 in spaced relation. The second transitional surfaces 60 are preferably of a rectangular shape, and are connected to a respective one of the transitional end 48 of the yoke 44 adjacent thereto. A distance between a central longitudinal line of the passage means 56 of the yoke 44 and an end of the protruding end 46 is preferably less than the distance measured between the central longitudinal line of the passage means 56 and a connection to one of the second transitional surfaces 60.

Each one of the first transitional surfaces 40 is connected to one of the front, back, top and bottom walls 28–34, and to two of the second transitional surfaces 60.

Preferably, the front, back, top and bottom walls 28–34, the attaching means 44, the first and second transitional surfaces 40,60 and the first and second sidewalls 36,38 all have planar surfaces inclined to each adjacent surface. This inclination is preferably 45° so that the surfaces provide a faceted envelope from which the attaching means or yokes 44 protrude for connection as will be discussed hereinafter. The faceted surfaces provide for the fracturing of the flowing water as it impinges on the module 22, and hence, the system 20.

Figure 2:
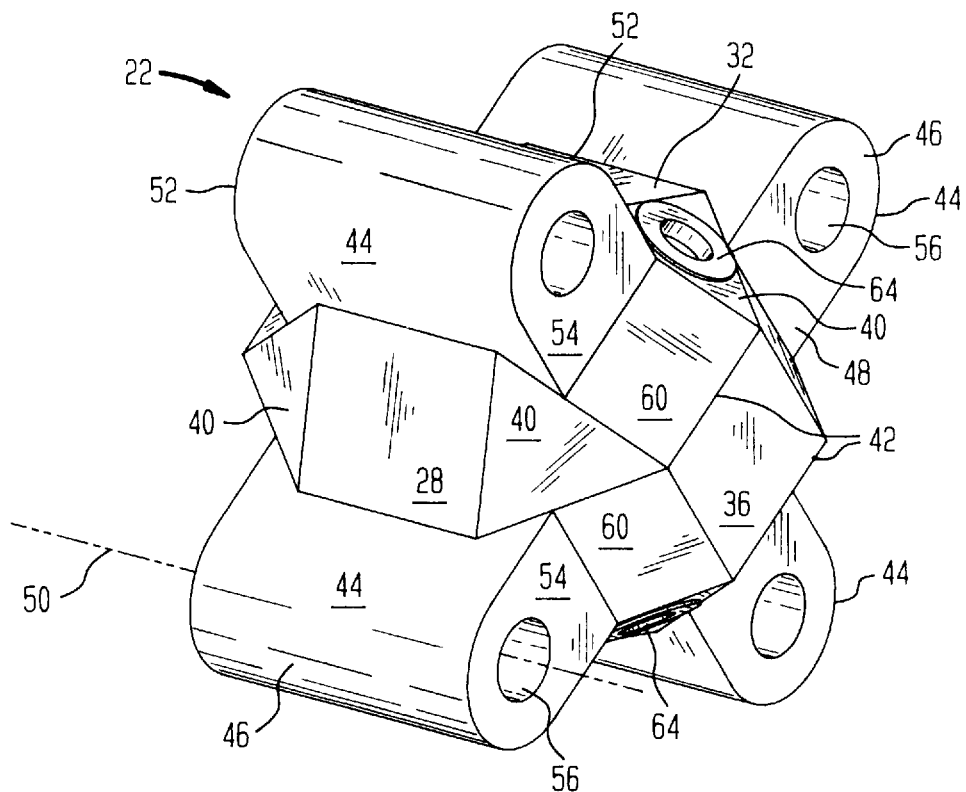
FIG. 2 is a front perspective view of a module for extracting energy from flowing water according to the present invention.

A hollow watertight chamber is formed when the front, back, top and bottom walls 28–34, the attaching means 44, the first and second transition surfaces 40,60 and the first and second sidewalls 36,38 in spaced relation are connected as shown in particular in FIG. 2.

The buoyant body can have its mass and buoyancy adjusted by introducing fresh, brackish or salt water into an interior of the body, depending upon the chemistry, wave action and bottom contour in which the system 20 is disposed. Each one of the buoyant bodies is formed with an aperture means such as a port 62 in each one of two opposed first transitional surfaces 40, as shown in particular in FIGS. 2–3. The modules 22 are preferably arranged in the water as shown in these figures, and see also FIG. 10 so that the aperture means 62 are arranged in a top to bottom orientation to fill and/or drain each module 22 as the conditions warrant. A closure means such as a removable plug 64 is adapted to immediately seal a corresponding one of the parts 62.

Figure 13:
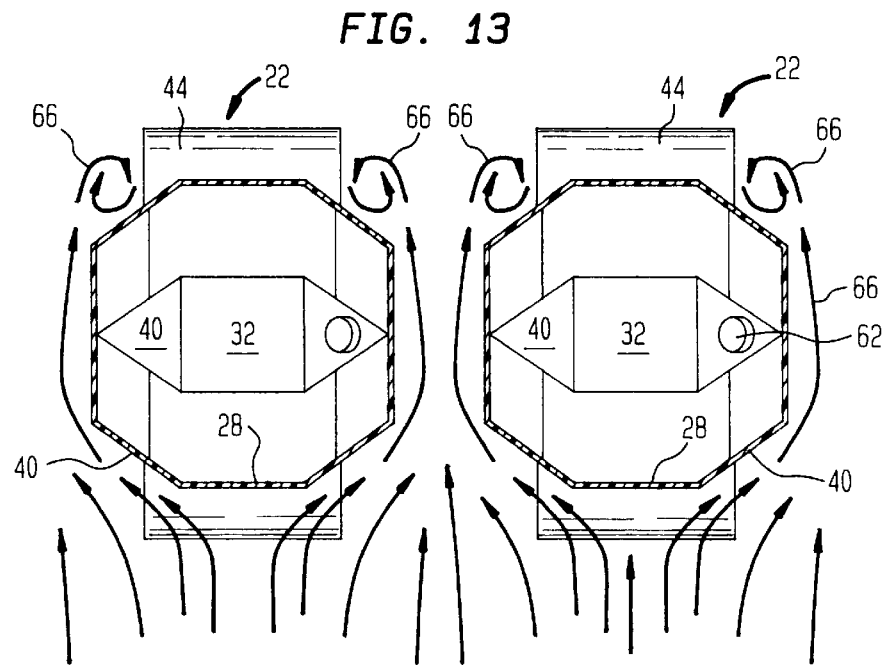
FIG. 13 is a partial cross sectional view of a pair of the modules and the coaction therebetween for extracting energy from flowing water taken along line 13—13 of FIG. 12.

In use, each one of the modules 22 in the system is arranged as shown in FIG. 2 such that preferably, the angle of incidence of the wave impacting the modules 22 contacts the wall 28 at which point the flow of water is fractured to be guided along the first transition surfaces 40, resulting in eddies and vortexes 66, such as that shown in FIG. 13.

Figure 3:
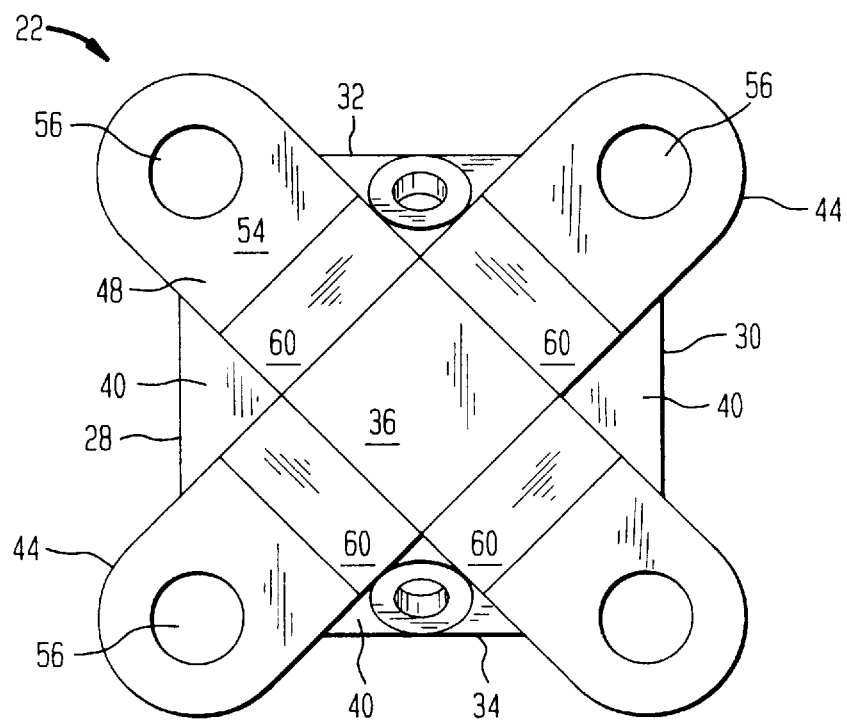
FIG. 3 is right side view of the module as shown in FIG. 2.
Figure 4:
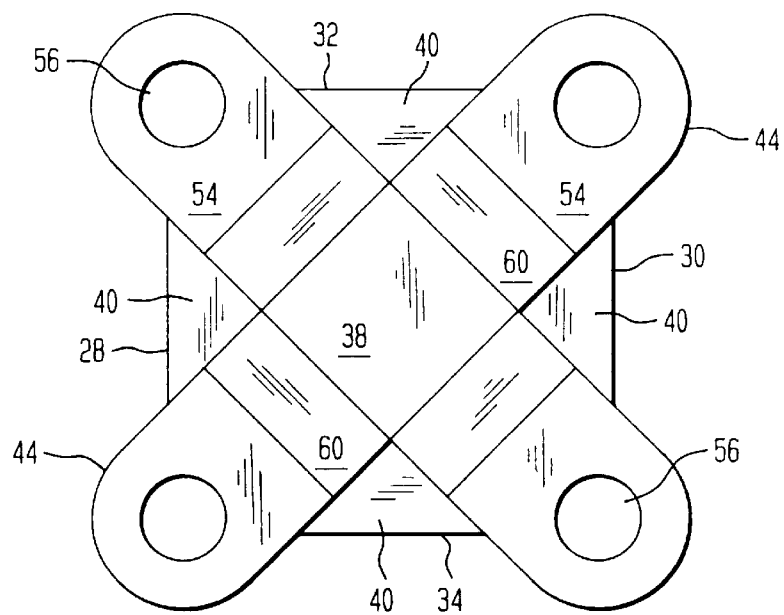
FIG. 4 is a left side view of the module as shown in FIG. 2.
Figure 5:
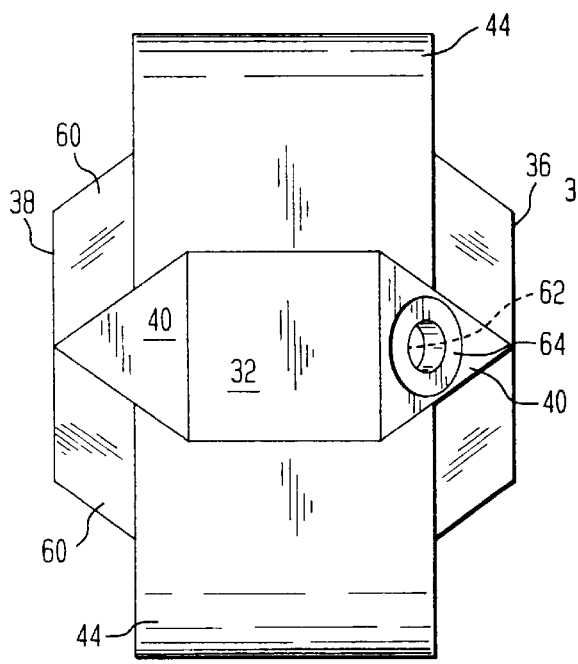
FIG. 5 is a top plan view of the module, the opposite bottom plan view being a mirror image thereof.
Figure 6:
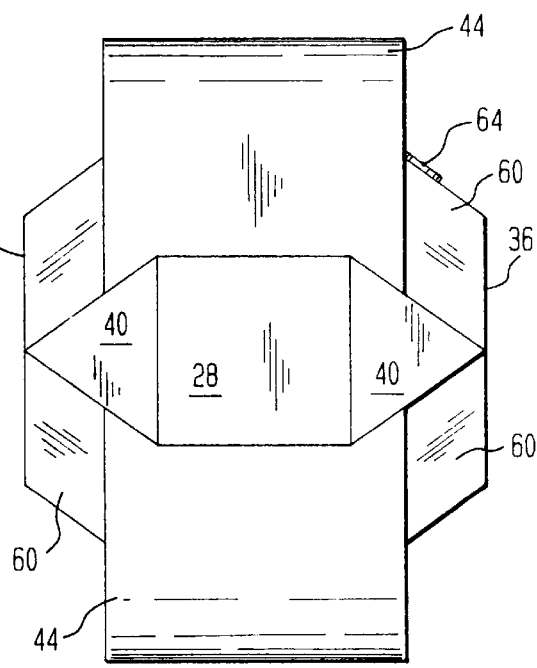
FIG. 6 is a front plan view of the module, the opposite rear plan view being a mirror image thereof.
Figure 7:
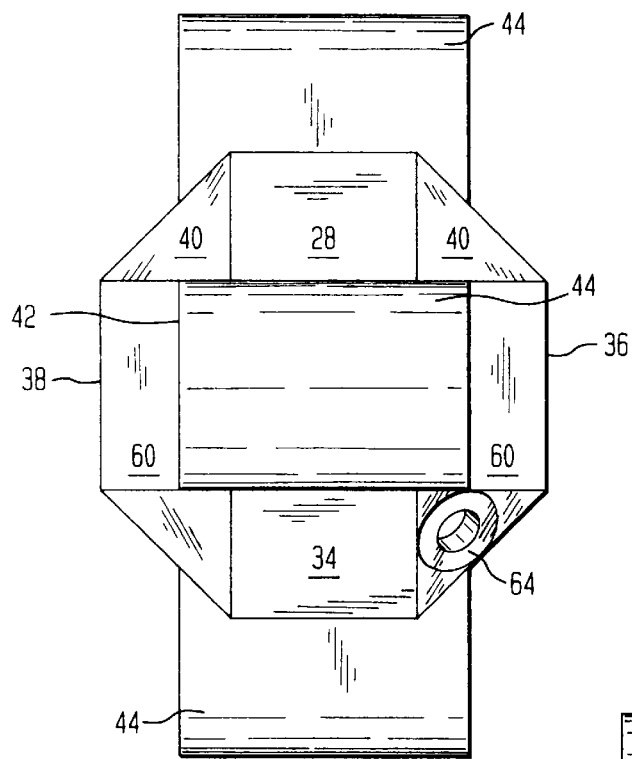
FIG. 7 is a front plan view of the module pivoted 45°.
Figure 8:
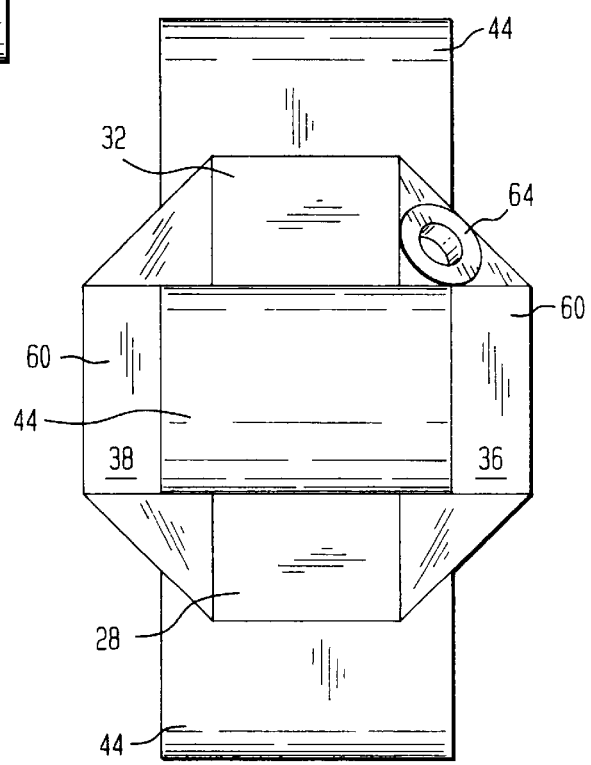
FIG. 8 is a top plan view of the module in FIG. 7 pivoted 45°.
Figure 9:
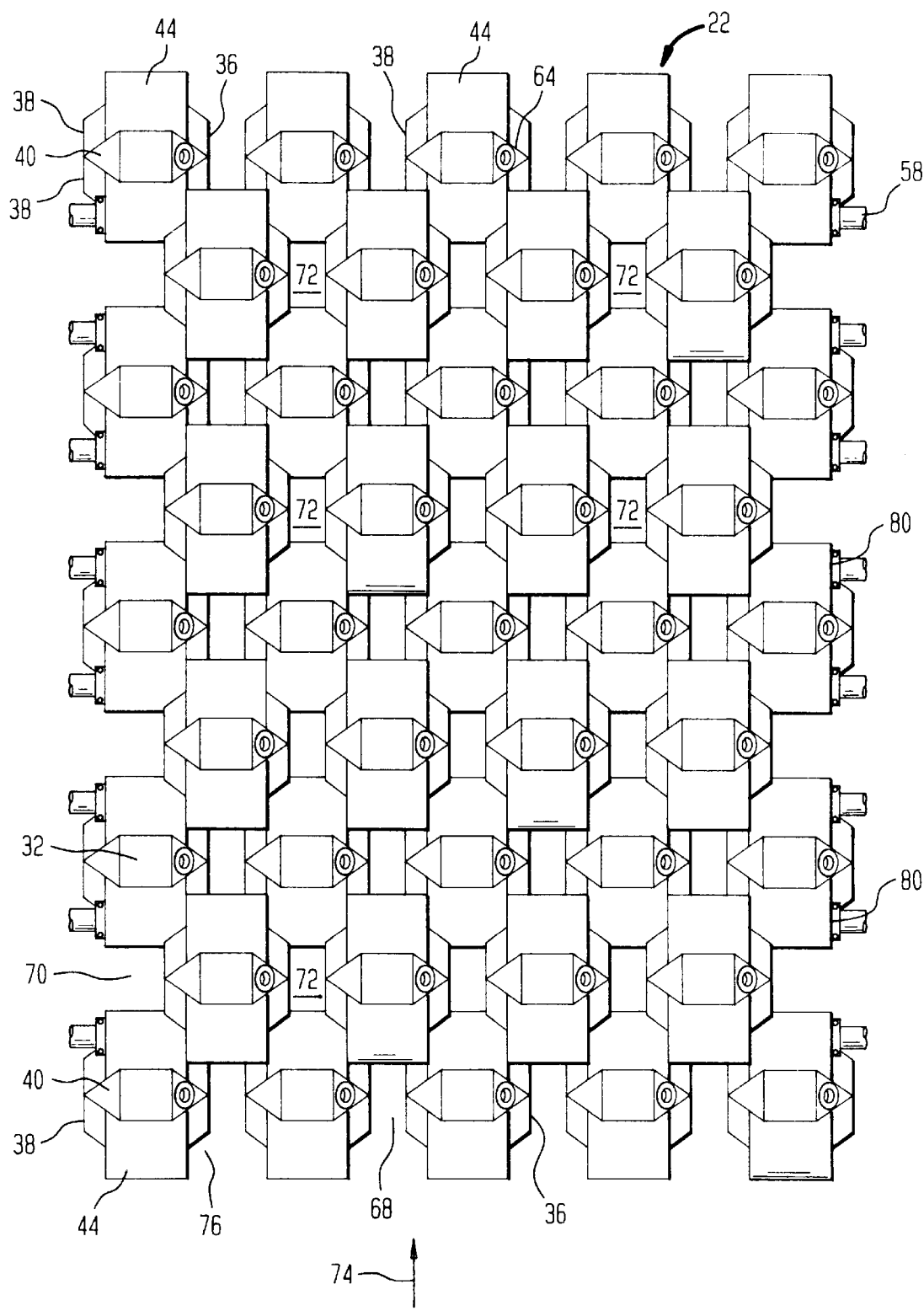
FIG. 9 is a top plan view of a wave energy extraction system consisting of a multiplicity of the modules arranged in layers according to the present invention.
Figure 10:
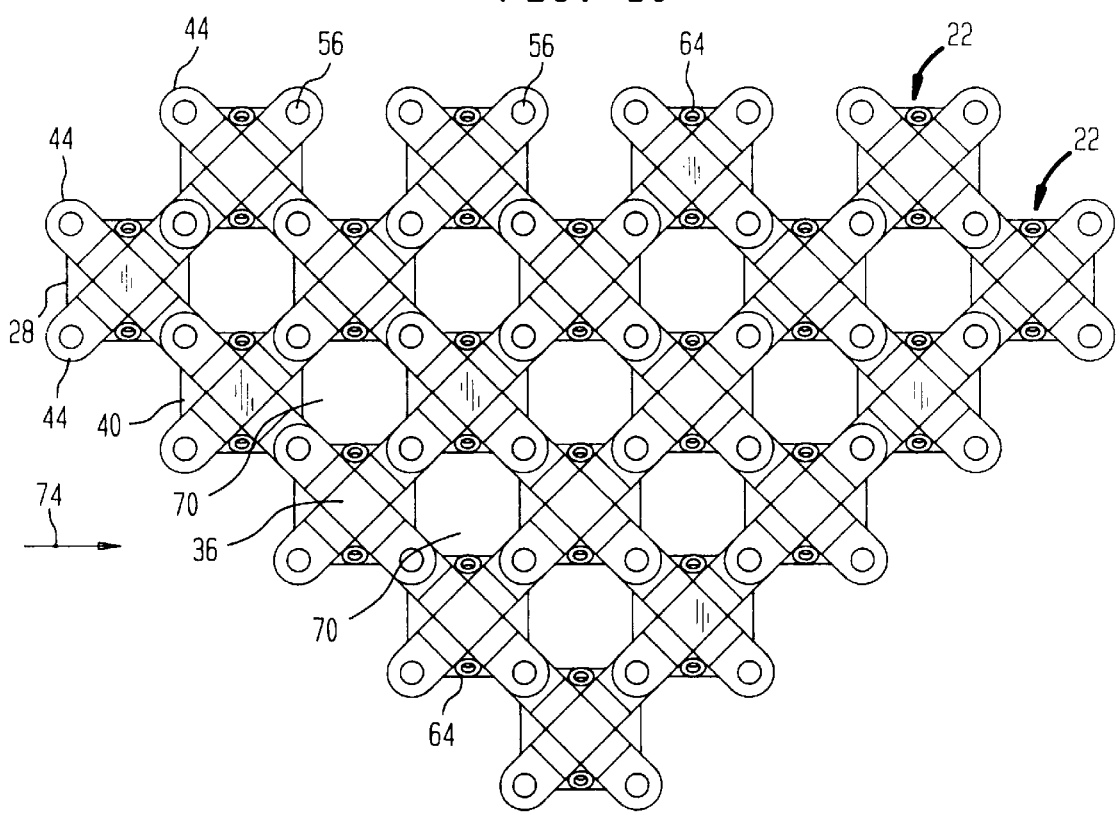
FIG. 10 is a partial side elevational view of the wave energy extraction system shown in FIG. 9.

In FIGS. 9–10, the modules 22 of the present invention are shown arranged in layers to provide the preferred pyramidal shape for use in the offshore environment. As shown, the attaching member 58 consists of marine rubber cables, such as resilient rodes used to interconnect the protruding ends 46 of each one of the modules 22 with, in some instances, four other separate and discrete modules 22. The rodes 58 are formed of marine rubber which is extremely resilient and strong to withstand thousands of pounds of force repeatedly being exerted on the system. The view of FIGS. 9–10 shows the arrangement of avenues 68, streets 70 and shafts 72 through which the water is permitted to flow to impact and be fractured on the faceted surfaces of each successive module 22. FIG. 3 shows the front wall 28, first transitional surface 40 and two adjacent protruding ends 46 intended to receive the oncoming flowing water to be fractured. This perspective is shown again in FIG. 10 with a plurality of the modules 22 of the system 20. An arrow 74 indicates movement of the flowing water from offshore to onshore.

The mounting of the modules 22 with respect to each other to form the preferred pyramidal shape results in a plurality of the avenues 68 running along a length of the system 20 as shown in FIG. 9, and a plurality of the streets 70 extending across the width of the system 20 and transverse to the avenues 68, as shown in FIGS. 9–10. The avenues 68 and shafts 72 for the passage of water are substantially rectangular in shape, while each one of the street 70 passages as shown in particular in FIG. 10 is substantially octagonal in shape.

Figure 11:
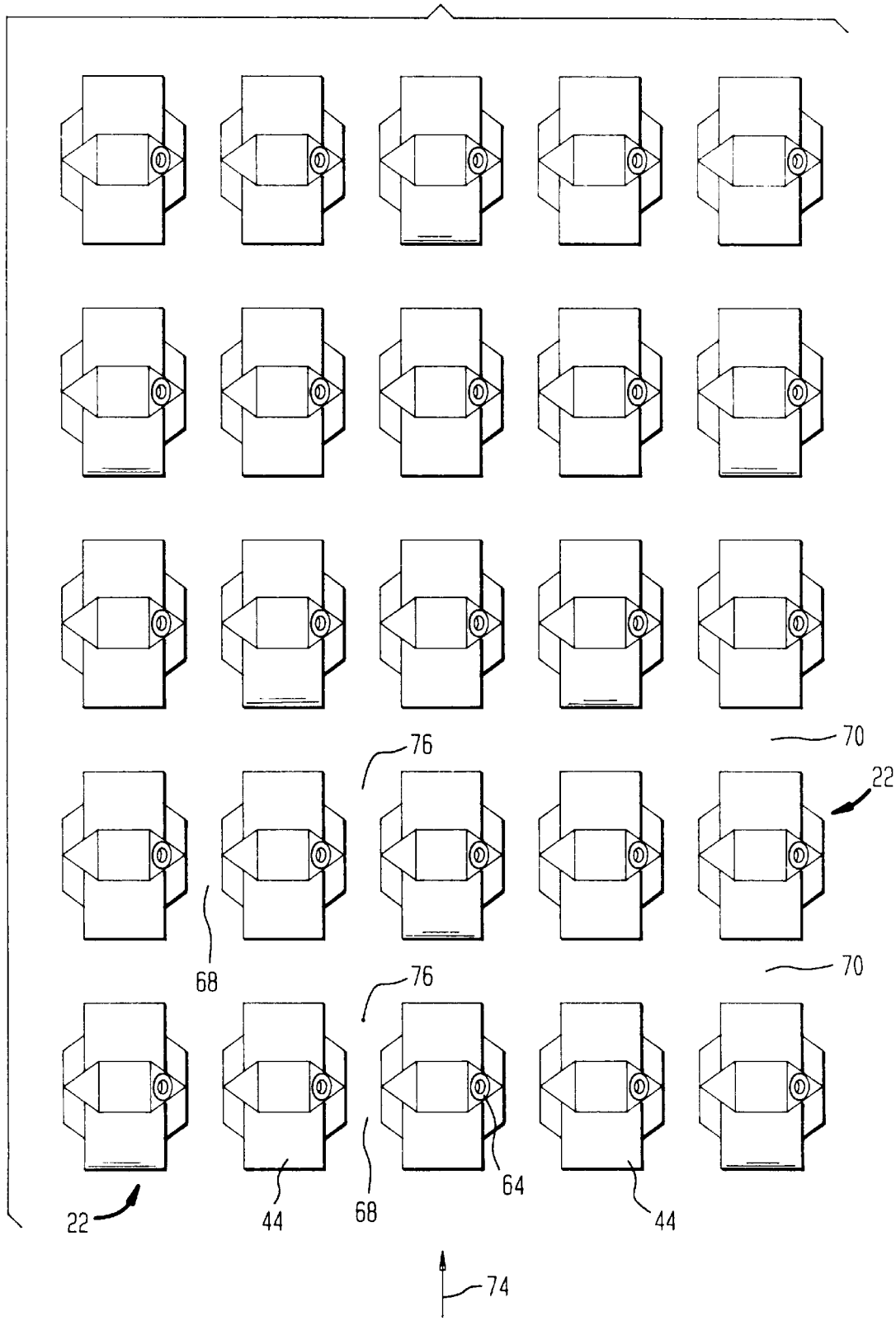
FIG. 11 is a top plan view of the wave energy extraction system of FIG. 9, showing only one layer of the modules.

In FIG. 11, the relationship between the avenues 68 and streets 70 to form plazas is shown. The plazas 76 provide for an area in which the water from the fractured wave is permitted to be deflected off the faceted surfaces of each one of the modules 22 to impact each other as shown in FIG. 13 to create the eddies and vortexes 66 which interfere with the flow of the water itself, as well as any oncoming waves. In effect, the construction of each one of the modules 22 and the system 22 as a whole is designed to employ the energy of the flow of water against itself so that the detrimental power of the waves is substantially reduced if not eliminated.

In addition, the marine rodes have resilient properties to secure the system 20 to the anchoring assembly 24, such as an anchoring assembly distributed commercially under the trademark MANTA RAY®. The entire system 20 resiliently rises and falls with the movement of the waves. When the flowing water first impacts the system 20, in addition to any upwelling of the water which may occur due to the underlying bottom contour, the system 20 provides for a concertina/bellows effect. That is, after the flow of water has impacted and been fractured on the faceted surfaces and protruding ends of the modules 22, it moves through the avenues 68, streets 70 and shafts 72 and plazas 76. The hydrodynamic force of the oncoming water causes the system 20 to expand to receive the water under the concertina effect to catch or swell as much of the energy that remains in the oncoming wave. The return resiliency of the system 20 provides its own kinetic energy as the concertina effect collapses thereby further interfering with successive waves impacting on and entering the system 20.

The arrangement of the modules 22 in layers by tying a plurality of modules 22 together with a plurality of horizontal rodes 58 is important to the invention. Preferably, the modules 22 are connected to each other in three dimensions to provide the most impact upon the oncoming flowing water.

Figure 12:
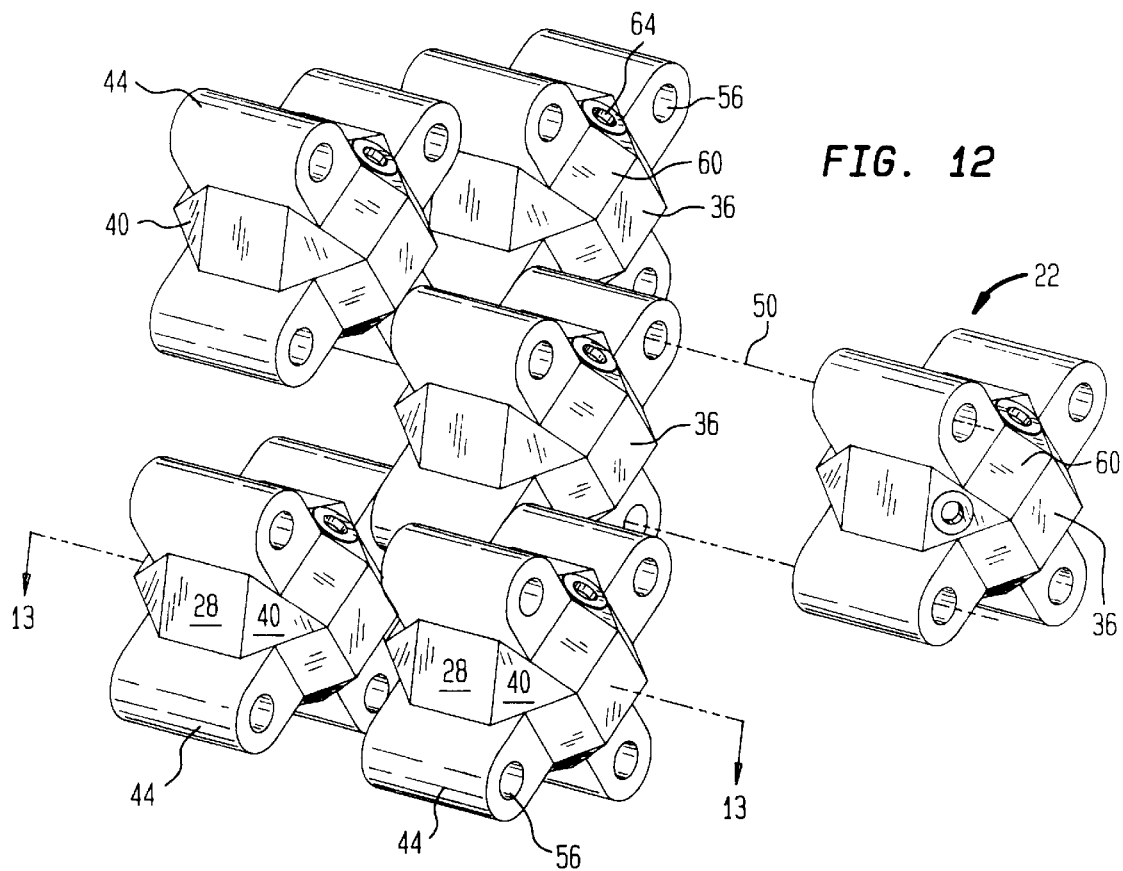
FIG. 12 is a partial front perspective view of an arrangement of a plurality of the modules of the wave energy extraction system.

The system employs at least three rows of modules 22, i.e. a first primary horizontal row of modules connected to another module of a second horizontal row vertically disposed from the first horizontal row which in turn is connected to still another module 22 of a third horizontal row as shown in FIGS. 10 and 12.

In FIG. 14 a plurality of systems 20 are anchored offshore of a beach 78 to extract energy from the flowing water and waves. The arrangement of the systems 20 can be in parallel columns, or as shown, in staggered rows. The latter is the preferable arrangement so that each one of the separate and discrete systems 20 interferes with the wave action of one of the other systems.

The energy dissipating system 20 of the present invention can be constructed and arranged as an assembly or a flotation body to react to hydrodynamic forces produced by waves. Such a system consists of a plurality of interconnectible modules 22 and the means to resiliently connect the modules, such as the attaching members 58, to enable the modules 22 to spread when subjected to hydrodynamic forces produced by waves, and concentrate when the forces are reduced. There is also provided means to adjust the buoyancy of the flotation body, which means includes the aperture means 62 and removable plug 64 discussed above. In addition, the anchoring assembly 24 resiliently restrains displacement of the assembly urged by the buoyancy and hydrodynamic forces associated with the waves.

In particular, the modules 22 are constructed to be assembled to thereby form vortexes 66 between and among the modules 22. The spaces, i.e. the avenues 68, streets 70, shafts 72, and plazas 76, are arranged to form flow patterns for an impeded flow of the water through the assembly. Each of the modules 22 is constructed and arranged to coact with the other modules 22 to form an impeded flow path about and among the modules such that the eddies and vortexes 66 discussed above are formed.

The arrangement of the modules 22 with respect to each other provides for a pumping action between and among the modules in reaction to the buoyancy of the modules and the hydrodynamic forces to which the assembly is exposed.

The resilient restraint of the displacement of the assembly can also be controlled by adjusting the mass and buoyancy of each module 22, and therefore the assembly. The use of the elastomeric rodes secured to anchors in the sea floor 82 permits each one of the assemblies to be restrained at a strategic location. The anchoring of the assembly restrains the assembly to a locus at the strategic assembly. The locus can be adjusted upon selecting an elastomeric rode having a particular length and inherent resiliency.

The present invention also provides for a method of disrupting wave action prior to the waves contacting the shore 78 and causing erosion. The method is directed to forming an assembly or a system 20 from a plurality of the modules 22, and then connecting the plurality of separate modules 22 to be resilient in at least one dimension. Of course, arranging a plurality of layers such that the layers are interconnected to each other, such as shown in FIG. 10 is preferred. The modules 22 are resiliently connected in a horizontal direction to enable spreading and concentration of the individual modules in response to hydrodynamic energy exerted by waves contacting the system 20. The assembly is positioned and anchored to a locus at a select strategic location to interfere with the oncoming waves. The buoyancy and mass of the assembly with respect to the wave action at the strategic location is also adjusted by adjusting the size and shape of the assembly and the position and number of separate modules 22.

Each one of the modules 22 can be filled with air, foam, sea water, sand or marine concrete depending upon the frequency desired for the system 20, and will have an inertial mass of approximately 35,000 pounds. In the arrangement of the modules 22 to form the system 20, the oncoming flow of water is forced to impact and be fractured upon the system 20 as a heavily resistant filter, such as an energy filter. The anchoring cables 24 formed of marine rubber permit the system 20 to rise with the surge of the waves and at a certain point resist the movement, thereby further fracturing the oncoming flow of water.

Since energy is not destroyed but is converted, the movement of the system 20 on its resilient rodes 58 of the anchoring system converts the wave energy to heat, mechanical motion and potential energy which can be used for other applications.

A system 20 according to the present invention can be made into any size, depending upon the number of modules 22 and the layering structuring employed. For example, for a system to measure 12' wide×10' deep, approximately fifty one (51) pieces of the modules 22 will be required. The horizontal rodes 58 interconnect the protruding ends of the modules. Locking caps 80 are used to secure ends of the rodes 58 at the spaced apart terminating surfaces 54, which function as bearing surfaces discussed above. The system 20 is naturally buoyant and without fill will have a lifting capacity of in excess of 15,000 pounds in water.

A plurality of the systems 20 are preferably placed in horizontal rows parallel to and in appropriate depth from the shore 78 to create a flexible energy filter through which waves must pass to reach the shore. Under certain conditions, horizontal rows will be paralleled by a second or third horizontal row which will act as a layer defense in those environments where the wave activity is more vigorous or the shore is exposed to storms.

An uppermost layer of the system can be painted in an international color such as orange, to denote certain areas. The system 20 is constructed such that only approximately one layer of modules 22 will extend from the water's surface, depending upon the salinity of the water. In addition, the anchoring assembly 24 is such that system 20 can be uncoupled from its mooring and removed to a remote location where it can be used, repaired or replaced.

It will be understood that the embodiments described herein are merely exemplary and that a person skilled in the art may make many variations and modifications without departing from the spirit and scope of the invention. All such modifications and variations of the invention are intended to be covered in the appended claims.

What is claimed is:

1. A buoyant body, comprising:
    a front wall;
    a back wall;
    a top wall;
    a bottom wall;
    a first and a second side wall in a spaced relation;
    first transitional surfaces connecting each of said front, back, top and bottom walls to each of said sidewalls in spaced relation;
    attaching means connected to at least one of each of said front, back, top and bottom walls, said attaching means comprising:
    yoke means having:
        a protruding end and a transition end,
        the protruding and extending from said adjacent front, back, top and bottom walls and having a length disposed perpendicular to the first and second sidewalls in spaced relation,
        the protruding end comprising a cylindrical section having a longitudinal axis substantially perpendicular to the plane of each of said sidewalls in spaced relation,
        the protruding end terminating in spaced apart surfaces substantially parallel to the first and second sidewalls in spaced relation;
        passage means formed to extend through said protruding end and spaced apart terminating surfaces,
        a distance between the spaced apart terminating surfaces of the protruding end being less than a distance between the first and second sidewalls in spaced relation,
        said spaced apart terminating surfaces of said protruding end being disposed in parallel relation to each other,
        said spaced apart terminating surfaces of said protruding end being adapted to act as bearing surfaces,
        the distance between the spaced apart terminating surfaces of the protruding end being greater than the width of the adjacent front, back, top and bottom walls,
        said passage means constructed and arranged for receiving an attaching member,
        each of said yoke means connected to two adjacent walls of said front, back, top and bottom walls;
        second transitional surfaces connecting each of said attaching means to one of said first and second sidewalls in spaced relation,
        each of said second transitional surfaces connected to one of said first and second sidewalls in spaced relation,
        each of said second transitional surfaces connected to one of said transitional ends of the yoke means adjacent thereto,
        a distance between a central longitudinal line of the passage means and the end of the protruding end being less than the distance between the central longitudinal line of the passage means and the connection to the second transitional surface,
        each of said first transitional surfaces connected to one of said front, back, top and bottom walls, and to two of said second transitional surfaces;
        said front, back, top and bottom walls, said attaching means, said first and second transitional surfaces, and said first and second sidewalls in spaced relation having planar surfaces inclined to all adjacent surfaces;
        said front, back, top and bottom walls, said attaching means, said first and second transitional surfaces, and said first and second sidewalls in spaced relation connected and coacting to form a continuous envelope defining a hollow watertight chamber;
    means to adjust the buoyancy of said buoyant body, said buoyancy means, comprising:
        aperture means disposed in each of two opposed first transitional surfaces, and closure means for each of said aperture means to maintain the buoyant body watertight.

2. A buoyant body, comprising:

a continuous envelope defining a hollow watertight chamber, the continuous envelope including:
 a front wall;
 a back wall;
 a top wall;
 a bottom wall;
 a first and second sidewall in a spaced relation;
 a plurality of intersecting planar surfaces;
yoke means connected to at least two spaced locations on said continuous envelope, and constructed and arranged to attach said buoyant body in a three dimensional relationship, said yoke means comprising:
 a cylindrical section extending from said adjacent front, back, top, and bottom walls, the cylindrical section having:
  a length disposed perpendicular to the first and second sidewalls in spaced relation,
  a longitudinal axis substantially perpendicular to the plane of each of said sidewalls in spaced relation, and
  spaced apart terminating surfaces substantially parallel to the first and second sidewalls in spaced relation; and
 means to adjust buoyancy and mass of said buoyant body.

3. The buoyant body according to claim 2, further comprising:
first transitional surfaces connecting each of said front, back, top and bottom walls to each of said sidewalls in spaced relation.

4. The buoyant body according to claim 3, wherein the attaching means is connected to at least one of each of said front, back, top and bottom walls.

5. The buoyant body according to claim 2, further comprising:
passage means formed to extend through said protruding end and spaced apart terminating surfaces.

6. The buoyant body according to claim 5, wherein:
a distance between the spaced apart terminating surfaces of the protruding end is less than a distance between the first and second sidewalls in spaced relation,
said spaced apart terminating surfaces of said protruding end being disposed in parallel relation to each other,
said spaced apart terminating surfaces of said protruding end being adapted to act as bearing surfaces, and
the distance between the spaced apart terminating surfaces of the protruding end being greater than the width of the adjacent front, back, top and bottom walls.

7. The buoyant body according to claim 5, wherein the passage means is constructed and arranged for receiving an attaching member.

8. The buoyant body according to claim 2, wherein each of the yoke means is connected to two adjacent walls of the front, back, top and bottom walls.

9. The buoyant body according to claim 2, further comprising:
second transitional surfaces connecting each of the attaching means to one of the first and second sidewalls in spaced relation, each of the second transitional surfaces connected to one of the first and second sidewalls in spaced relation, and each of said second transitional surfaces connected to one of the transitional ends of the yoke means adjacent thereto.

10. The buoyant body according to claim 9, wherein a distance between a central longitudinal line of the passage means and the end of the protruding end is less than the distance between the central longitudinal line of the passage means and the connection to the second transitional surface.

11. The buoyant body according to claim 9, wherein each of the first transitional surfaces is connected to one of the front, back, top and bottom walls, and to two of the second transitional surfaces.

12. The buoyant body according to claim 11, wherein the front, back, top and bottom walls, the attaching means, the first and second transitional surfaces, and the first and second sidewalls in spaced relation have planar surfaces inclined to all adjacent surfaces.

13. The buoyant body according to claim 12, wherein the front, back, top and bottom walls, the attaching means, the first and second transitional surfaces, and the first and second sidewalls in spaced relation are connected and coact to form a continuous envelope defining a hollow watertight chamber.

14. The buoyant body according to claim 9, wherein the means to adjust the buoyancy and mass of the buoyant body, comprises:
aperture means disposed in each of two opposed second transitional surfaces; and
closure means for each of the aperture means to maintain the buoyant body watertight.

15. An energy dissipating assembly for flowing water, comprising:
a plurality of modules forming a flotation body, comprising:
 each of said modules having a plurality of connecting points for enabling connection of a module in three dimensions;
 at least one primary lateral connecting means connecting a plurality of the modules to form a first primary horizontal row of modules,
 each of said modules in said first primary horizontal row connect to another module to form a second horizontal row vertically disposed from said first horizontal row,
 each of said modules in said second horizontal row connected to another module to form a third horizontal row vertically disposed from said second horizontal row;
 second lateral connecting means connecting said plurality of modules forming said second horizontal row;
 third lateral connecting means connecting said plurality of modules forming said third horizontal row;
 the modules in said first primary, second and third rows coactively connected in spaced relationship to form avenues, streets and shafts among the modules;
 said first primary, second and third connecting means allowing for resilient lateral movement of said modules in said respective horizontal row upon exertion of hydrodynamic force against the energy dissipating assembly;
anchoring means for anchoring said flotation body to a floor beneath the flowing water;
position restraining means connecting the flotation body with said anchoring means; and
means to adjust the buoyancy of said flotation body.

16. The energy dissipating assembly according to claim 15, further comprising:
an area for flowing water where each avenue, street and shaft intersect.

17. An energy dissipating assembly for extracting energy from waves, comprising:

a plurality of interconnectible modules;

means to resiliently connect the modules horizontally to enable the modules to spread when subjected to hydrodynamic forces produced by waves and concentrate the modules when the forces are reduced the means to connect the modules including:

means to interconnect the modules in at least two dimensions; and means to resiliently restrain displacement of the assembly urged by buoyancy and hydrodynamic forces associated with the waves.

18. The energy dissipating assembly according to claim 17, wherein the interconnectible modules are constructed for assembly to form spaced between the modules.

19. The energy dissipating assembly according to claim 18, wherein the spaces are constructed and arranged to form a flow pattern for an impeded flow of water through the assembly.

20. The energy dissipating assembly according to claim 19, wherein each one of the modules is constructed and arranged to coact with other of the modules to form an impeded flow path about and among the modules.

21. The energy dissipating assembly according to claim 20, wherein each of the modules is constructed and arranged to disrupt water flow among the modules and produce interference between the water flow around adjacent modules.

22. The energy dissipating assembly according to claim 17, wherein the means to interconnect the modules is constructed and arranged to provide for a pumping action among the resiliently connected modules.

23. The energy dissipating assembly according to claim 17, further comprising:

means to adjust the buoyancy of the plurality of modules.

24. The energy dissipating assembly according to claim 17, further comprising:

means to adjust the mass of said of plurality of modules.

25. The energy dissipating assembly according to claim 17, wherein the means to resiliently restrain, comprises:

a plurality of elastomeric rodes.

26. The energy dissipating assembly according to claim 25, wherein the plurality of elastomeric rodes are attached to anchors fixed to a floor beneath the waves.

27. A method of disrupting wave action, the method comprising the steps of:

forming an assembly from a plurality of separate modules;

connecting the plurality of separate modules to be resilient in at least one dimension for coaction among the modules to enable spreading and concentration of the modules in response to waves contacting the assembly to deflect hydrodynamic energy exerted by the waves against the assembly;

positioning the assembly at a strategic location to disrupt wave action; and anchoring the assembly to restrain the assembly to a locus at the strategic location.

28. The method according to claim 27, further comprising the step of:

adjusting the buoyancy and mass of the assembly in relation to the wave action at the strategic location to produce maximum disruption of the wave action.

29. The method according to claim 27, further comprising the step of:

adjusting the size and shape of the assembly by adjusting the position and number of separate modules.

30. The energy dissipating assembly for extracting energy from waves, comprising:

a plurality of separate and discrete modules adapted for interconnection with each other;

means for resiliently connecting the plurality of modules for dispersing and collapsing with respect to each other in response to hydrodynamic forces exerted on the plurality of modules; and means for resiliently restraining displacement of the assembly urged by buoyancy and hydrodynamic forces associated with the waves on the assembly, the restraining means coacting with the connecting means to provide a bellows effect among the plurality of modules.

* * * * *